United States Patent
Dijkman et al.

(10) Patent No.: US 10,410,096 B2
(45) Date of Patent: Sep. 10, 2019

(54) CONTEXT-BASED PRIORS FOR OBJECT DETECTION IN IMAGES

(71) Applicant: QUALCOMM Incorporated, San Diego, CA (US)

(72) Inventors: Daniel Hendricus Franciscus Dijkman, Haarlem (NL); Regan Blythe Towal, La Jolla, CA (US); Venkata Sreekanta Reddy Annapureddy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 149 days.

(21) Appl. No.: 14/882,373

(22) Filed: Oct. 13, 2015

(65) Prior Publication Data

US 2017/0011281 A1 Jan. 12, 2017

Related U.S. Application Data

(60) Provisional application No. 62/190,685, filed on Jul. 9, 2015.

(51) Int. Cl.

| | |
|---|---|
| *G06K 9/66* | (2006.01) |
| *G06N 3/02* | (2006.01) |
| *G06K 9/32* | (2006.01) |
| *G06K 9/00* | (2006.01) |
| *G06K 9/46* | (2006.01) |
| *G06K 9/72* | (2006.01) |
| *G06K 9/62* | (2006.01) |

(52) U.S. Cl.
CPC ............ *G06K 9/66* (2013.01); *G06K 9/00684* (2013.01); *G06K 9/3241* (2013.01); *G06K 9/4628* (2013.01); *G06K 9/6267* (2013.01); *G06K 9/72* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 6,952,632 B2 * | 10/2005 | Robert | G05D 1/0676 340/951 |
| 7,089,092 B1 * | 8/2006 | Wood | G01S 19/15 342/33 |
| 8,214,309 B1 | 7/2012 | Khosla et al. | |
| 8,345,921 B1 | 1/2013 | Frome et al. | |
| 8,699,767 B1 | 4/2014 | Khosla et al. | |
| 8,948,454 B2 | 2/2015 | Datta et al. | |

(Continued)

OTHER PUBLICATIONS

LSUN: Construction of a Large-Scale Image Dataset using Deep Learning with Humans in the Loop Fisher Yu Ari Seff Yinda Zhang Shuran Song Thomas Funkhouser Jianxiong Xiao; Jun. 4, 2016 (Year: 2016).*

(Continued)

*Primary Examiner* — Nancy Bitar
(74) *Attorney, Agent, or Firm* — Seyfarth Shaw LLP

(57) ABSTRACT

Context-based priors are utilized in machine learning networks (e.g., neural networks) for detecting objects in images. The likely locations of objects are estimated based on context labels. A machine learning network identifies a context label of an entire image. Based on the context label, the network selects a set of likely regions for detecting objects of interest in the image.

28 Claims, 9 Drawing Sheets

(56) References Cited

U.S. PATENT DOCUMENTS

| | | | | |
|---|---|---|---|---|
| 9,275,308 | B2* | 3/2016 | Szegedy | G06K 9/4628 |
| 9,342,759 | B1* | 5/2016 | Chen | G06K 9/6262 |
| 9,536,293 | B2* | 1/2017 | Lin | G06T 7/0002 |
| 9,704,054 | B1* | 7/2017 | Tappen | G06K 9/46 |
| 9,760,807 | B2* | 9/2017 | Zhou | G06K 9/66 |
| 2008/0247628 | A1* | 10/2008 | Ramsing | G06K 9/00127 |
| | | | | 382/133 |
| 2010/0026525 | A1* | 2/2010 | Feyereisen | G01C 5/005 |
| | | | | 340/972 |
| 2013/0041529 | A1* | 2/2013 | He | G08G 5/0021 |
| | | | | 701/17 |
| 2014/0185925 | A1* | 7/2014 | Datta | G06K 9/6256 |
| | | | | 382/159 |
| 2014/0254923 | A1* | 9/2014 | Vidal Calleja | G06K 9/4676 |
| | | | | 382/159 |
| 2015/0170002 | A1* | 6/2015 | Szegedy | G06K 9/66 |
| | | | | 382/156 |
| 2015/0238148 | A1* | 8/2015 | Georgescu | A61B 5/7267 |
| | | | | 600/408 |
| 2015/0294192 | A1* | 10/2015 | Lan | G06F 16/285 |
| | | | | 382/159 |
| 2016/0328643 | A1* | 11/2016 | Liu | G06N 3/084 |
| 2017/0147869 | A1* | 5/2017 | Chen | G06F 17/30256 |
| 2017/0243051 | A1* | 8/2017 | Chukka | G06K 9/00147 |

OTHER PUBLICATIONS

Erhan D., et al., "Scalable Object Detection Using Deep Neural Networks", 2014 IEEE Conference on Computer Vision and Pattern Recognition, IEEE, Jun. 23, 2014 (Jun. 23, 2014), pp. 2155-2162, XP032649294, DOI: 10.1109/CVPR.2014.276.

Girshick R., et al., "Rich Feature Hierarchies for Accurate Object Detection and Semantic Segmentation Tech Report (v5)", Oct. 22, 2014 (Oct. 22, 2014), pp. 1-21, XP055295233, Retrieved from the Internet: URL: https://arxiv.org/pdf/1311.2524v5.pdf.

International Search Report and Written Opinion—PCT/US2016/039651—ISA/EPO—dated Aug. 23, 2016.

Oquab M., et al., "Is Object Localization for Free?—Weakly-Supervised Learning with Convolutional Neural Networks", 2015 IEEE Conference on Computer Vision and Pattern Recognition (CVPR), IEEE, Jun. 7, 2015 (Jun. 7, 2015), pp. 685-694, Jun. 7, 2015, XP032793478.

Pinheiro P.O., et al.,"From Image-Level to Pixel-Level Labeling with Convolutional Networks", 2015 IEEE Conference on Computer Vision and Pattern Recognition (CVPR), IEEE, Jun. 7, 2015 (Jun. 7, 2015), pp. 1713-1721, Jun. 7, 2015, XP032793628, DOI: 10.1109/CVPR.2015.7298780 [retrieved on Oct. 14, 2015].

Girshick R., "Fast R-CNN," arXiv preprint arXiv: 1504.08083v1, Apr. 30, 2015, pp. 1-9.

Girshick R., "Fast R-CNN," arXiv preprint arXiv: 1504.08083v2, Sep. 27, 2015, pp. 1-9.

Redmon J., et al., "You Only Look Once: Unified, Real-Time Object Detection," arXiv preprint arXiv: 1506.02640v3, Jun. 11, 2015, pp. 1-9.

Springenberg J.T., et al., "Striving for Simplicity: The All Convolutional Net," arXiv preprint arXiv:1412.6806v3, ICLR, Apr. 13, 2015, pp. 1-14.

Szegedy C., et al., "Scalable, high-quality object detection," arXiv preprint arXiv: 1412.1441v2, Feb. 26, 2015, pp. 1-9.

Torralba A: "Contextual Priming for Object Detection", Jan. 1, 2003, XP002597601, 23 Pages.

* cited by examiner

CONTEXT-BASED PRIORS FOR OBJECT DETECTION IN IMAGES

CROSS-REFERENCE TO RELATED APPLICATION

The present application claims the benefit of U.S. Provisional Patent Application No. 62/190,685, filed on Jul. 9, 2015, and titled "REAL-TIME OBJECT DETECTION IN IMAGES VIA ONE GLOBAL-LOCAL NETWORK," the disclosure of which is expressly incorporated by reference herein in its entirety.

BACKGROUND

Field

Certain aspects of the present disclosure generally relate to machine learning and, more particularly, to utilizing context-based priors in a machine learning network for detecting objects in images.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back-propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect, a method of object detection is disclosed. The method includes identifying a context label of an entire image. The method also includes selecting a set of likely regions for detecting objects of interest in the image based on an identified context label.

Another aspect discloses an apparatus for object detection having a memory and at least one processor coupled to the memory. The processor(s) is configured to identify a context label of an entire image. The processor(s) is also configured to select a set of likely regions for detecting objects of interest in the image based on an identified context label.

Another aspect discloses a non-transitory computer-readable medium for object detect. The non-transitory computer readable medium has non-transitory program code recorded thereon which, when executed by the processor(s), causes the processor(s) to perform operations of identifying a context label of an entire image. The program code also causes the processor(s) to select a set of likely regions for detecting objects of interest in the image based on an identified context label.

Another aspect discloses an apparatus for object detection and includes means for identifying a context label of an entire image. The method also includes means for selecting a set of likely regions for detecting objects of interest in the image based on an identified context label.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to a deep neural network architecture for detecting (locating) objects in images. In particular, aspects of the present disclosure utilize context-based priors for object detection. Further aspects of the present disclosure include training an internal feedback mechanism.

Figure 1:
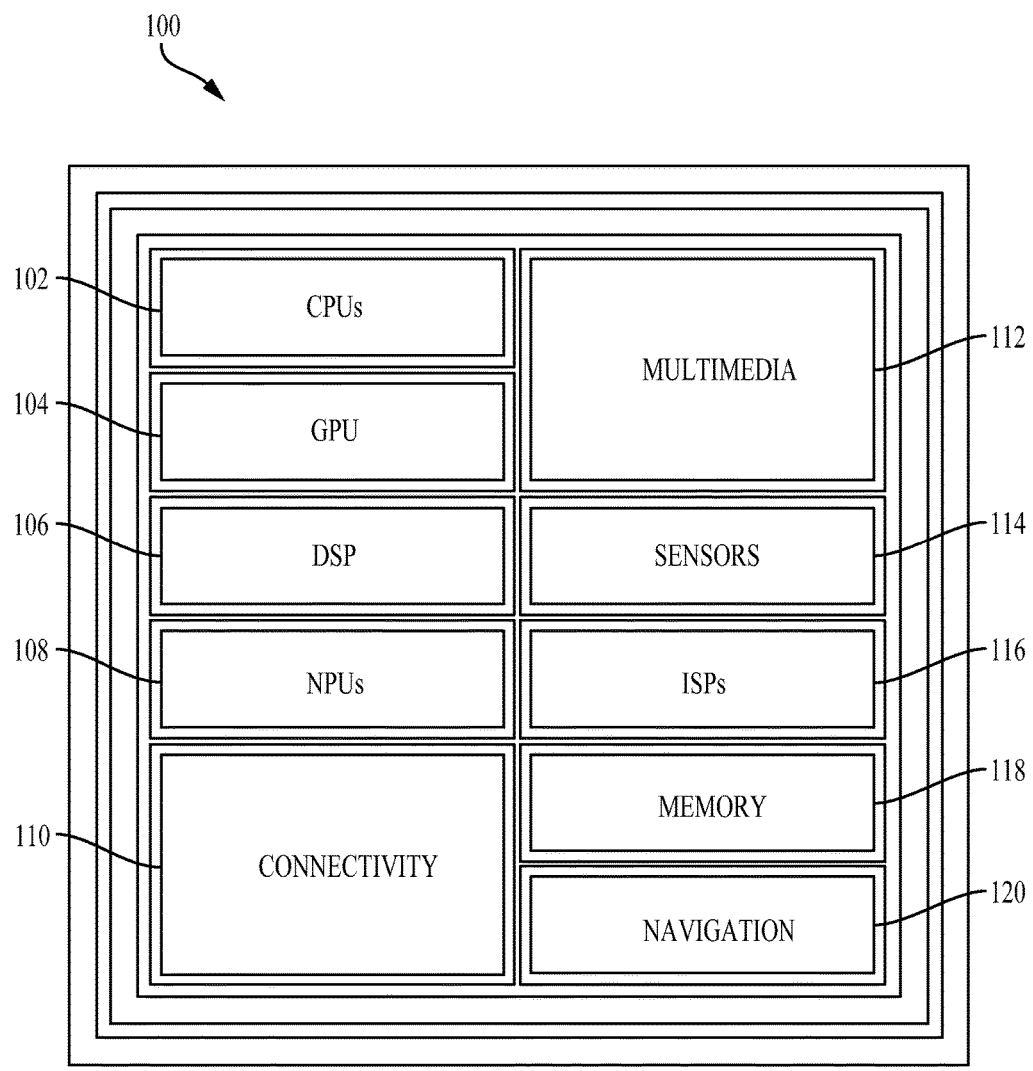
FIG. 1 illustrates an example implementation of designing a neural network using a system-on-a-chip (SOC), including a general-purpose processor in accordance with certain aspects of the present disclosure.

FIG. 1 illustrates an example implementation 100 of the aforementioned deep neural network architecture using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC may be based on an ARM instruction set. In an aspect of the present disclosure, the instructions loaded into the general-purpose processor 102 may comprise code for identifying a context label. The instructions loaded into the general-purpose processor 102 may also comprise code for selecting a set of likely regions of detecting objects of interest in an image based on the identified context label.

Figure 2:
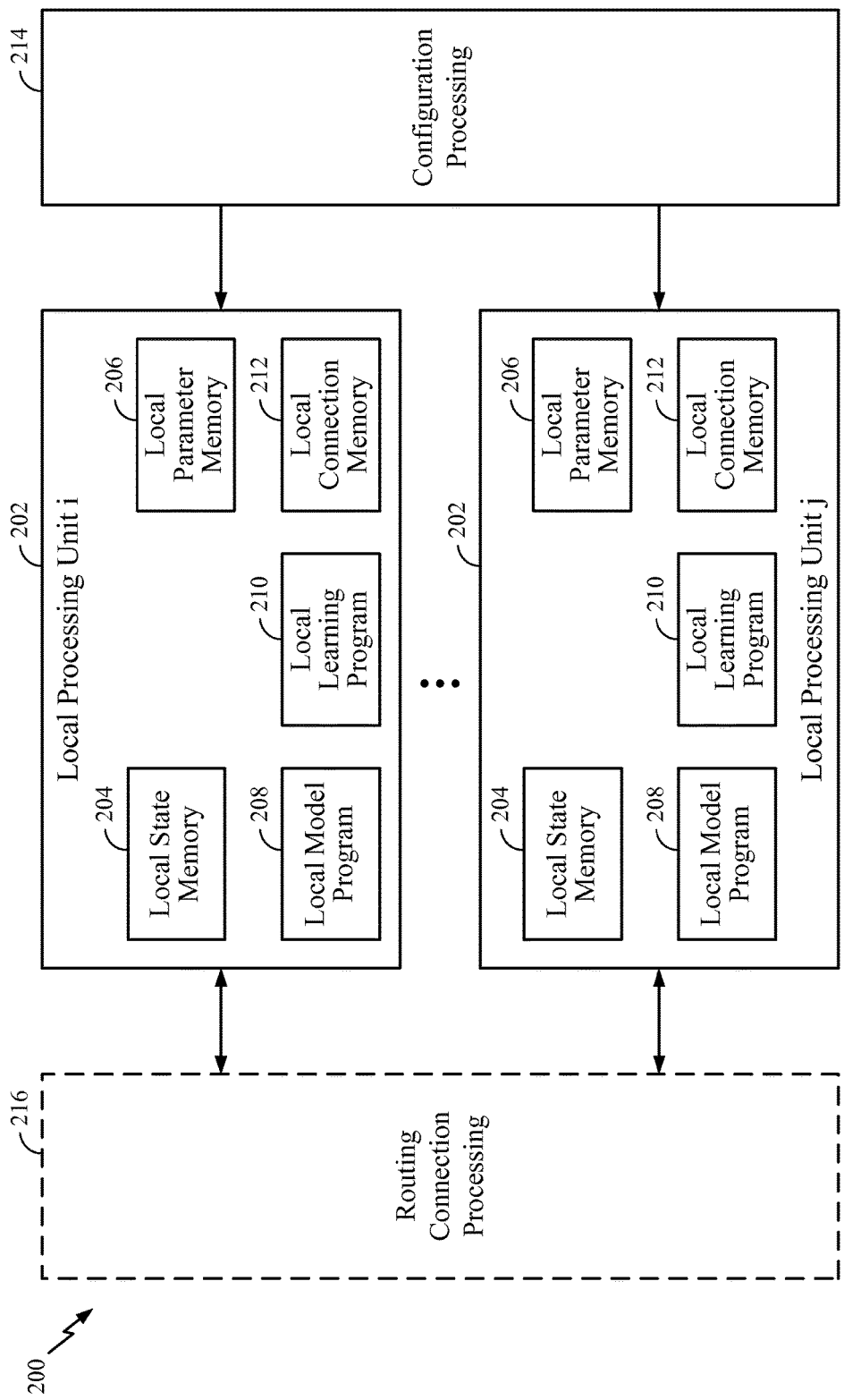
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. If presented with auditory data, the first layer may learn to recognize spectral power in specific frequencies. The second layer, taking the output of the first layer as input, may learn to recognize combinations of features, such as simple shapes for visual data or combinations of sounds for auditory data. Higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer is communicated to another neuron in the same layer. A recurrent architecture may be helpful in recognizing patterns that unfold in time. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
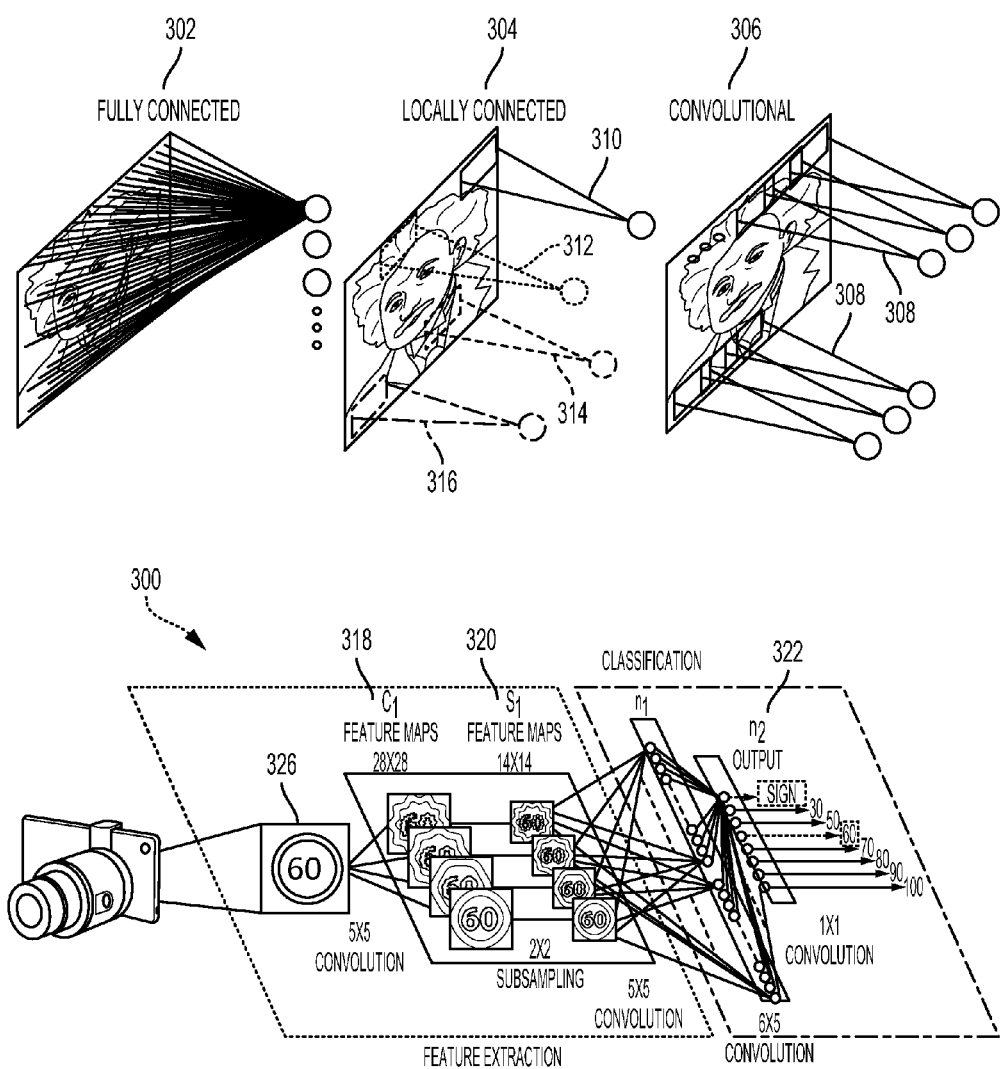
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a given layer may communicate its output to every neuron in the next layer. Alternatively, in a locally connected network 304, a neuron in a given layer may be connected to a limited number of neurons in the next layer. A convolutional network 306 may be locally connected, and is furthermore a special case in which the connection strengths associated with each neuron in a given layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 328. The output 328 may be a vector of values corresponding to features such as "sign," "60," and "100." The network designer may want the DCN to output a high score for some of the neurons in the output feature vector, for example the ones corresponding to "sign" and "60" as shown in the output 328 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To properly adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back-propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 328 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318, 320, and 322, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled 324, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
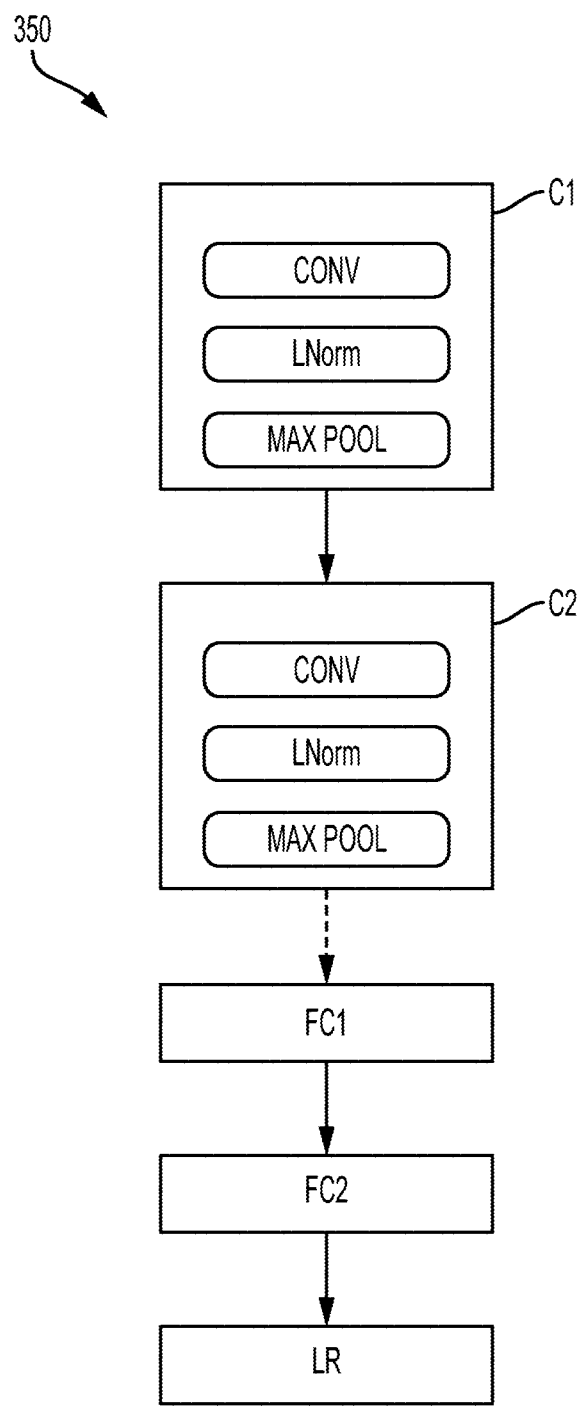
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolution blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
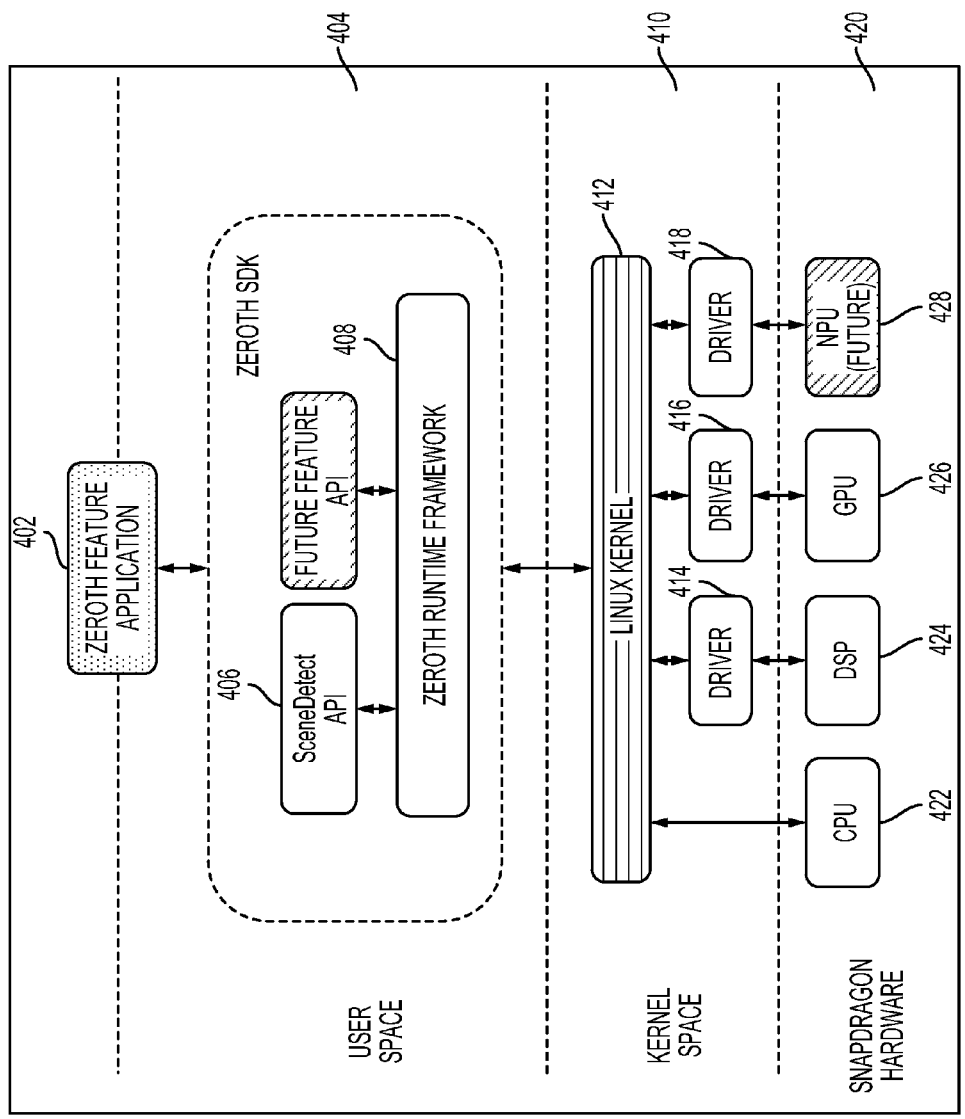
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
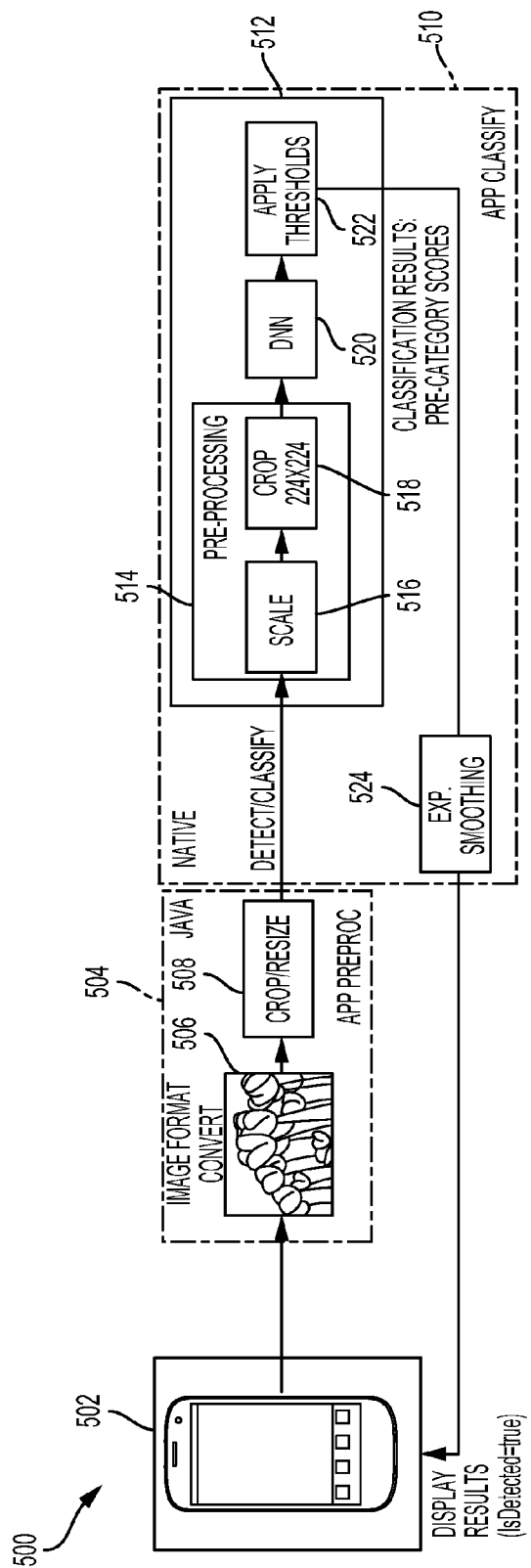
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

Object Detection in Images

Figure 6:
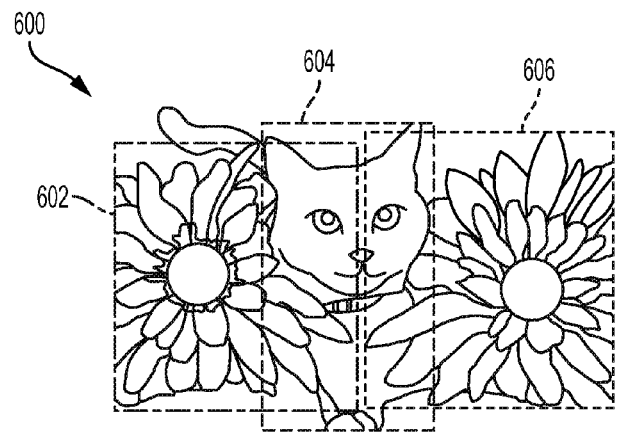
FIG. 6 illustrates example bounding boxes used to identify objects in an image.

Deep neural networks may be used in computer vision to detect and locate objects in images. Objects may be characterized by various different categories (e.g., bird, power drill, or backpack). An object may be located in an image by putting a tight, axis-aligned bounding box around it, as illustrated in FIG. 6. In particular, in the image 600, a first bounding box 602 is around a flower object in the image 600. A second bounding box 604 is around a second object (e.g., a cat) and a third bounding box 606 is around a flower object. These bounding boxes may be specified by four values: the minimum and maximum x and y coordinates of the box. When a detection system proposes a bounding box, it is judged correct if the bounding box overlaps with the ground truth bounding box, as determined via human annotation, 50% or more (e.g., intersection(ground_truth, proposed)/union(ground_truth, proposed)>0.5). Detecting an object in an image is made difficult by the many possible views and scales of the same category and by partial occlusions.

Examples of various methods for searching for objects include: selective search and deep neural network (DNN) classifier, combination of selective search/spatial pyramid pooling/support vector machine (SVM) classifier, deep ID searching, and multiple bounding box searching.

Selective search refers to a category-agnostic bounding box proposal method. Given an image, a selective search segments the image into various areas by clustering pixels according to various criteria. Depending on the settings, selective search returns in the range of 500 to 5000 bounding box proposals around these areas. The bounding box proposals may or may not be close to bounding boxes of actual objects. A deep neural network (DNN) classifier is then trained to classify the cropped content of each proposed box as one of the object categories, or as something else. Additionally, a context label may be applied to describe the environment or setting in which the image exists. A separate neural network may be trained to supply full-image context by previous training on classification of the content of the full image. Having full-image context is important. For example, when seen in isolation, it might be hard to distinguish a ping-pong ball from a golf ball, but when seen in context (e.g., golf course vs. ping-pong table) this is instantly clear.

Selective search is relatively expensive, computationally. Computing the boxes for one image takes in the order of one second on a single core of a recent desktop CPU. Running the classifier on the hundreds of boxes also takes multiple seconds, because a single core of a desktop CPU can classify in the order of 10 boxes each second (this depends on the size of the neural network).

The combination of selective search, spatial pyramid pooling and SVM classifying may take a similar approach as R-CNN, but instead of taking the crops from the input image, it takes crops from feature-maps produced by a convolutional network. Spatial pyramid pooling is used to turn the arbitrary sized window in the feature map into a fixed length feature vector that is classified and fed into a binary SVM (one SVM for each category). In the spatial pyramid pooling approach, the box-classification network is run only once, on a high-resolution input image.

The method of deep ID searching is based on R-CNN (regions with CNN features) with additional improvements, such as pre-training on a dataset using the provided boxes and discarding selective search boxes deemed non-informative according to an existing detection system. The deep ID searching method also utilizes cascaded classifiers (e.g., extra fully connected layers learning only by example when a preceding layer could not classify correctly), incorporates deformation pooling and utilizes an ensemble of models with high diversity.

Multiple bounding box searching may utilize a deep neural network (DNN) to propose on the order of 10 to 1000 bounding boxes. The number of boxes is determined before training by the configuration of the network. For example, 100-200 boxes may be used in the detection aspect. The content of the proposed boxes is classified by a second network, which is supported by full-image context features from a third network.

The multiple bounding boxes may include a bounding box proposal network designed and trained to output a fixed number of N boxes. For each of the N boxes, it has a single output to predict the confidence an object of interest is in the box (a value in the range from 0 to 1). These confidence outputs are trained with a logistic loss function. Additionally, for each of the N boxes, the network has four location outputs to estimate the bounding box (minimum and maximum x and y coordinates). The coordinates range from 0 (left or top of the square input image) to 1 (right or bottom of the square input image). These location units are trained with a sum-of-squared difference cost function. Additionally, each of the confidence and location pairs is trained to handle only a certain window (or portion) of the input image. These windows are determined before training by clustering a large set of boxes from the training set into N priors.

During training, each bounding box from the training examples is first matched to the nearest prior, and the respective confidence and location pair for that specific prior is trained on that box. This makes each confidence and location pair responsible for a certain 'window of attention' in the output. This window implicitly also includes the scale of the object, as one large prior window might contain or overlap with several smaller ones.

Figure 7:
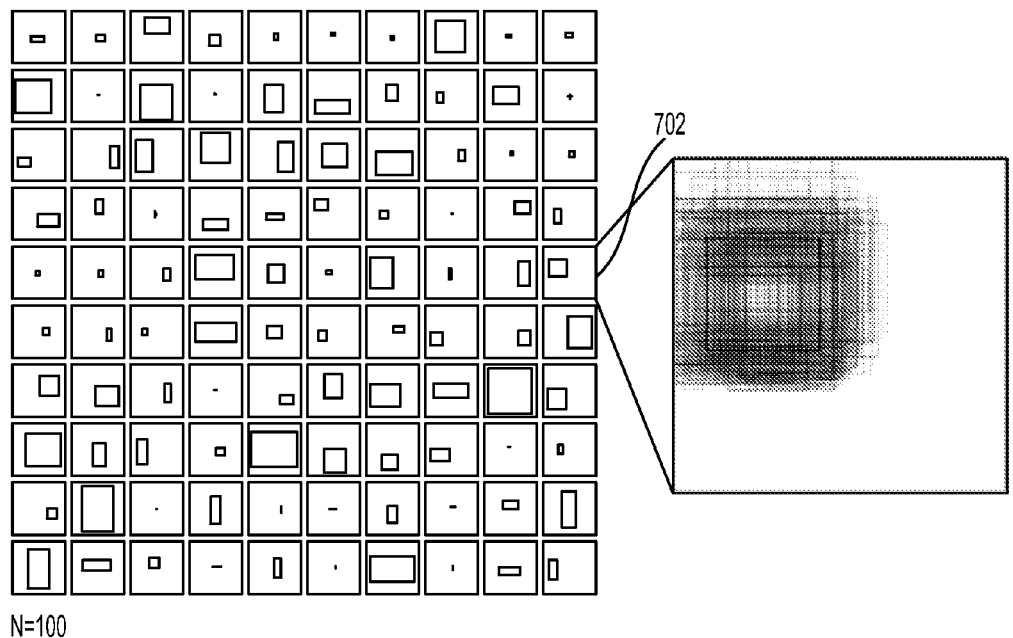
FIG. 7 illustrates N priors utilized for a multiple bounding box search method.

FIG. 7 illustrates an example of searching for objects using multiple bounding boxes. In this example, the network outputs N number of boxes, where N=100, as shown in the figure. A blow up of the prior box 702 is shown and illustrates the subset of bounding boxes, which map to the prior box 702. The subset of bounding boxes illustrates the window of attention of the corresponding confidence and location pair.

Context-Based Priors for Image Detection

A machine learning architecture, for example a deep neural network architecture, may be utilized for detecting and locating objects in images. The network architecture may utilize priors derived from a specific dataset to reduce the complexity of finding objects in images. Rather than voting on whether every possible box in an image contains an object or not, the priors are used to reduce the possible locations to only those boxes most likely to contain objects. The boxes most likely to contain objects are determined by clustering the locations of all the ground truth boxes and taking N cluster centers as the prior boxes. This approach uses only the location of the boxes and ignores information related to what is contained in the image or box.

Aspects of the present disclosure are directed to using context-based priors to detect objects in images. That is, likely locations of objects are estimated based on context labels. For example, it may be indicated to examine the top of an image for bird, when the context is determined to be "sky." Images having context labels such as "outdoor" are likely to have smaller and more widely distributed priors (e.g., looking at the horizon for a driving scenario), whereas those with context labels such as "indoor" are likely to have larger and more centrally located priors (e.g., looking centrally for a robot). To incorporate context-based priors, k-means clustering may be performed on the ground truth boxes after they are separated by M context labels, resulting in M groups of $N_m$ priors. During training and inference, the context labels may be used as a switch to select which group of priors to train/test. If more than one context label is present for an image, more than one group of priors may be trained at once. Importantly, the sum of all $N_m$ priors may potentially be smaller than N (the number of priors across all context categories) with the same performance if the context labels are strongly correlated with the prior boxes. The context-based priors may be used to focus the network's search to particular locations in an image, rather than having the entire network search over the entire image.

Context-based priors enable the consideration of a richer set of priors by enabling more relevant priors to be considered for a particular context. Further, by basing the priors on the context of the image, the dataset dependence is reduced.

Figure 8:
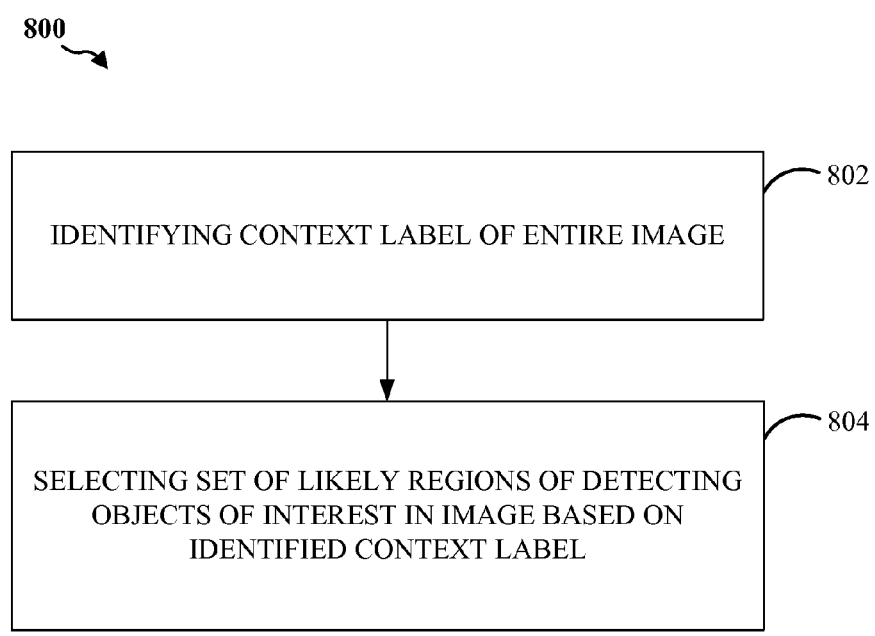
FIG. 8 illustrates an example of an overall method of utilizing context for detecting objects in images according to aspects of the present disclosure.

FIG. 8 illustrates a method 800 utilized by a deep neural network for detecting objects in an image. In one aspect, the deep neural network architecture consists of a single neural network. Alternately, in an optional configuration, the neural network architecture includes multiple neural networks jointly working together to detect objects in images.

In block 802, a neural network identifies a context label for an entire image. The context label can provide a meaningful categorization of the image. Next, the neural network, in block 804, selects a set of likely regions for detecting objects of interest in the image based on the identified context label. Additionally, the set of likely regions may be generated based on the context label. For example, if the context label is "outside" the neural network may look in lower regions of the image to detect grass and may look in upper regions to detect a bird in the sky. The neural network can also identify additional context label(s) and select other sets of likely regions for detecting objects of interest based on the additional identified context label(s). For example, the neural network may identify another context label and select another set of likely regions for detecting objects of interest in the image based on the other identified context label.

In another aspect, the context label may be based on user input. Optionally, the context label may be based on unsupervised learning. In yet another aspect, the neural network may be trained to detect objects. For example, the neural network may be trained to refine the set of likely regions. Additionally, the neural network may be trained to determine whether an object of interest is present for each of the likely regions. The neural network may also be trained to classify each of the likely regions according to the context label.

Figure 9:
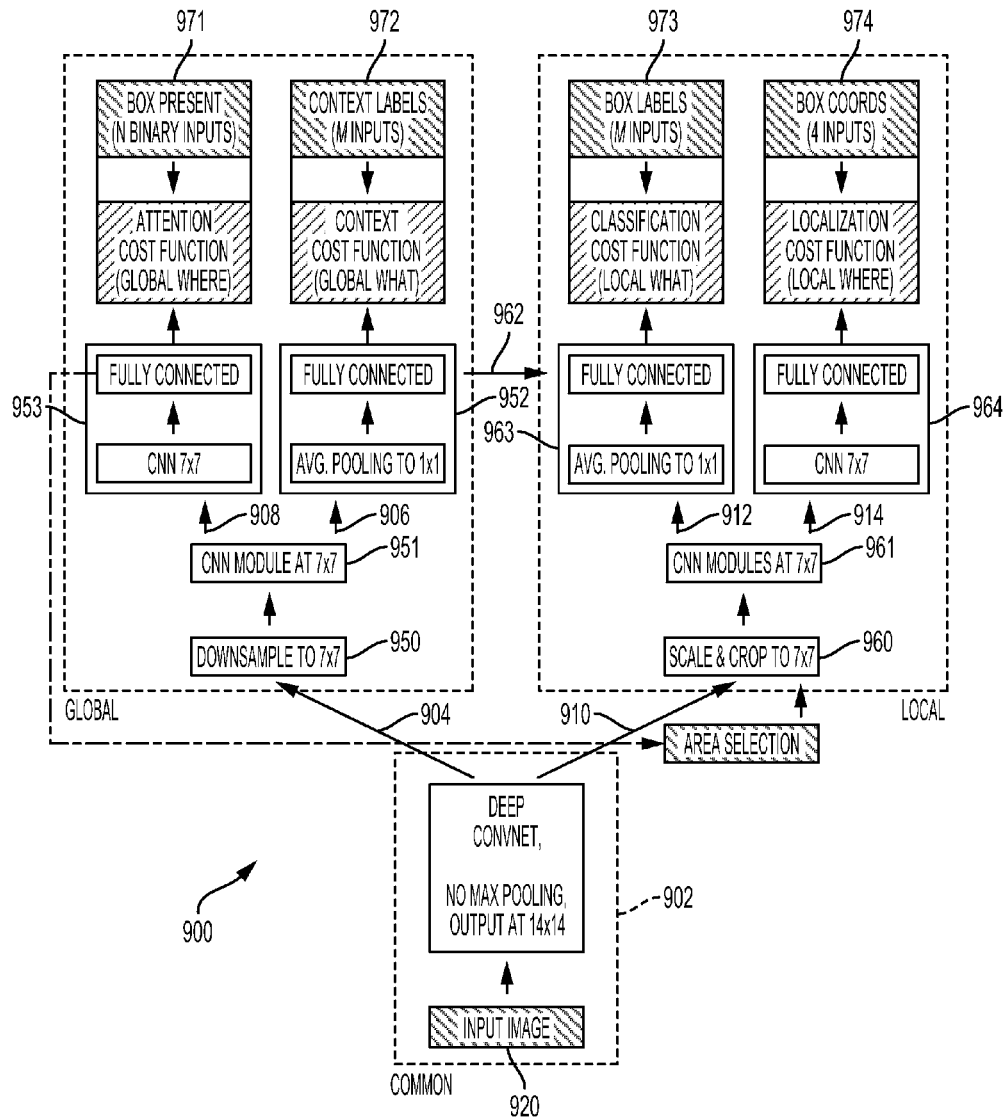
FIG. 9 illustrates an example network architecture for detecting objects in images according to aspects of the present disclosure.

FIG. 9 illustrates an example network architecture 900 for detecting objects in images. In one aspect, the network architecture consists of a single neural network. Alternately, in an optional configuration, the network architecture includes multiple neural networks jointly working together to detect objects in images.

The network architecture 900 splits into a global path 904 and a local path 910. The global path 904 examines an entire image to determine a global impression of what is in the image. The local path 910 examines a portion (e.g., a local area) of the image and determines what is in the local area. In one aspect, the global path 904 and local path 910 may run concurrently.

The base network 902 includes a convolutional neural network module and is configured to perform convolutions at multiple layers on a received image 920. In one example, the base network 902 may utilize average pooling instead of maximum pooling. Further, the base network 902 may be configured for training.

As indicated above, the base network 902 splits into two paths: a global path 904 and a local path 910. The global path 904 splits into two paths: a context path 906 ("global what" path) and an attention path 908 ("global where" path) to determine what objects are present in the image (context path/'global what') and the approximate location/placement of the object (attention path/"global where"). The local path 910 also splits into two paths: a classification path 912 and a localization path 914 to infer what is in the received localized image (classification path, 'local what') and where the object of interest is exactly located in the localized image (localization path, 'local where'). Further, the context path 906, attention path 908, classification path 912 and localization path 914 may all run concurrently.

An image 920 is input into the base network 902. Once the image 920 is input, the base network 902 is configured to perform convolutions at multiple layers. In one example, the base network 902 outputs a 14×14 image to both the global path 904 and the local path 910.

At box 950, the global path 904 down samples the received image 920. For example, the global path 904 may down sample a 14×14 image to a 7×7 image. Stride may be utilized for performing the down sampling instead of maximum pooling to preserve the location sensitivity of the network.

At box 951, a convolutional neural network (CNN) module performs convolutions at multiple layers and sends the output to the context path 906 and the attention path 908. At box 952, the context path 906 determines whether specific objects are expected in a scene (or window) of the image 920. The context path 906 provides full-image context of the received images, which may then be used for classification by the local path 910. In particular, the context path 906 may send output 962 to the classification path 912.

At box 953, the output of the attention path 908 may provide a confidence output. In particular, for each of the N prior boxes, the attention path 908 provides logistic outputs to signal whether an object of interest is present in the corresponding window. Further, the logistic outputs may be trained at module 971 based on whether a bounding box was matched to the corresponding prior. The attention path 908 may include an extra layer having a convolutional network to reduce the number of filters to an acceptable number. Further, at box 953, the attention path 908 outputs a signal indicating whether an object of interest is present in a corresponding window.

The output from the base network 902 is fed to the local path 910, which then crops and scales the image 920 at box 960. A CNN module performs convolutions in each layer at box 961 and splits the output to a classification path 912 and a localization path 914 to infer what is in the received image 920 (classification path, 'local what') and where the object of interest is exactly located (localization path, 'local where'). The classification path 912 is supported by the context features received from the context path 906. The localization path 914 determines where the object of interest is inside the window. The output of the localization path 914 is relative to the window and is transformed back to the global image level.

The local path 910 may benefit from knowing what prior window upon which it is operating. For example, each window may have its own statistics and the network may be able to adapt to these particular statistics. The coordinates of the crop and the ID of the prior may be injected into the local path 910 as extra feature maps. For example, 13 channels may be added (4 global prior box coordinates, 4 local prior box coordinates, 4 window coordinates and the prior ID). The same 13 values could be repeated across all pixels. For example, if it is known that a sky is being viewed, this information can be considered when making decisions.

The network architecture 900 may be trained utilizing training modules 971, 972, 973, and 974. For example, the training may be performed via error back-propagation. During training, a data provider (not shown) performs data augmentation (scaling, translation, horizontal mirroring) and adjusts the bounding box annotations accordingly. Boxes falling outside of the view are discarded. The data provider matches each of the bounding boxes to one of the priors, using bipartite matching to resolve any conflicts between boxes competing for the same prior.

Once the matching has been determined, the data provider creates the "box present" input. This input consists of one binary value for each prior signaling the presence or absence of an object in the corresponding window. The data provider then picks a window for training by the local path 910. Following are examples of various heuristics that may be tried:
  a) training the attention path 908 first, then using the output of the attention path 908 to train the local path 910;
  b) selecting windows corresponding to the matched bounding boxes from a dataset;
  c) selecting random windows with boxes as negative examples; and
  d) performing hard negative mining for negative examples Given the selected window, the data provider creates the box coordinates, box labels and area selection (shown within modules 973 and 974). For example, the module 974 can update the coordinates of the box to fit more tightly with the object of interest. The box coordinates are the minimum and maximum coordinates of the bounding box. These coordinates range from 0 to 1 and are relative to the local window. If no bounding box is present in the window, the bounding box cost function for that window may be disabled. The box labels are a positive, negative or skip value for each of the M categories. If the window only partially overlaps with the box, values in the range 0 to 1 may also be used to indicate the bounding box lies partially outside the window. However, occlusion due to the data augmentation system may be hard for the network to distinguish from naturally occurring occlusion. The area selection encodes the window to be used for cropping and/or scaling.

In one aspect, a detection task is utilized with two types of annotations. The first type is full-image annotation and includes a positive/negative/skip for each category. The second type of annotation includes positive bounding boxes for each category.

For many images, some bounding box annotations will be missing. Missing box annotations indicate that the present input of the box will miss many positives. This degrades the quality of the attention path 908 because it will (correctly) trigger on these areas, but get punished because the bounding box annotation is missing. The input of the local-path box labels (from training module 973) may use the full-image annotations (assuming these are complete) to set missing annotations at the bounding box level to skip.

To accelerate the training of the local path 910, multiple copies of the local path may be instantiated simultaneously. These copies share the weights between their respective layers. The data provider then selects a window for each local path. Further, a local path may be instantiated for each prior. This trains on all prior windows and all bounding box annotations in the image at the same time, at a relatively low cost. Additionally, in another example, a single local path may be utilized to forward propagate all priors, and back-propagate only the worst performing examples, in essence resulting in on-the-fly hard-negative mining.

As shown in FIG. 9, the network architecture 900 has four cost functions (each located within training modules 971, 972, 973, and 974) to cover the where and what pathways in the global and local networks. There are two main options for training this network, in stages or with a weighted cost function.

In the first method, the common network is pre-trained on a database of images and then frozen. Each of the global and local networks are then trained independently using a weighted cost function between the what and where components.

In the second method, a combined cost function for all four outputs may be created as follows:

$$C = \alpha_{global\_where} C_{global\_where} + \alpha_{global\_what} C_{global\_what} + \alpha_{local\_where} C_{local\_where} + \alpha_{local\_what} C_{local\_what}$$

The alpha values may be determined through cross-validation. Optionally, the alphas may be learned by using a cost function on the alphas alone that would force them to sum to 1.

In one example, inference with the network architecture 900 is first run over the context path (because it provides the full-image context features to the local path) and then iterated over each local window to determine where and what is visible. The attention path 908 may be ignored in this scenario.

Another aspect of the present disclosure is directed to power management. For example, in a mobile setting, the detection may be performed with little power usage. In particular, the attention path and context paths may be used as efficient indicators of what windows to evaluate in the local path. For example, only the top X windows may be checked, or only the windows whose attention output is above a certain threshold may be checked.

In one aspect, while applying efficient power management, the context path 906 is run first. If it indicates that objects of interest are present somewhere in the image 920 (with a low threshold), the attention path 908 may then be run to determine the most promising windows. Next, for each of the windows determined to be most promising, the local path 910 is run to determine what is present in the image 920 and the location.

Optionally, in another aspect, not all four of the top-level paths (e.g., context path 906, attention path 908, classification path 912 and localization path 914) are run on every image 920. The context path 906 can indicate whether specific objects are expected in a scene. For example, a context of "sunset" may not warrant further processing for objects, but a context of "soccer game" may. Thus, the context path 906 (global-what) may be run on every image 920 and then a decision may be made whether to run the attention path 908 (global-where) followed by the local path 910 (including the classification path 912 and localization path 914).

Additionally, the context may be utilized to limit or change the categories upon which the local path searches. The attention path 908 may be used to determine whether there are interesting objects in the image 920 before the context path 906 or local paths (e.g., classification path 912 and localization path 914) are run. If there are no interesting objects (based on some threshold value), then in one aspect, the other paths are not run. Further, the localization path 914 may be skipped when the goal is only to determine the presence or absence of a specific object in an image. For example, if the task is to search the photo gallery for pictures of a particular dog, the user does not care where the dog is in the picture, only that the dog is somewhere in the image/picture.

The network architecture 900, as shown in FIG. 9, may be viewed as a cascaded classifier. The attention path 908 (e.g., the global where path) determines whether an object of interest might be present in any of the prior boxes. If the attention path 908 is confident enough, the classification path 912 (e.g., the local what path) is run to perform a more precise classification.

An extra classifier may be inserted between these two steps. The input to this classifier is features coming from the scale and crop layer at box 960. The additional classifier may reject boxes that pass the attention path 908 (global where path), to reduce the number of forward passes though the local path 910. In one aspect, the classifier is simple and does not add significant computational overhead. The classifier may be implemented as a support vector machine or a fully connected layer.

In an alternate aspect, the attention path 908 may be replaced by a selective search module. Optionally, another aspect utilizes back-propagation of gradients to modulate scores for prior boxes in the attention path 908. A technique for class saliency visualization works by generating an artificial error gradient at the cost function of the neural network, and back-propagating this gradient to the input image. The pixels in the input image where the error gradient has the largest magnitude are likely pixels where the object is located. This technique may be used to modulate the scores for prior boxes in the attention path. In particular, the error signal for the highest scoring classes in the context path may be back-propagated. Additionally, the magnitude of the gradients for each of the priors (over the entire window corresponding to the prior) is integrated. The resulting value is used to update the scores produced by the attention path 908. Back-propagation can also be applied to the module 972 for global context labels.

In one configuration, a machine learning model is configured for identifying a context label of an entire image. The model is also configured for selecting a set of likely regions of detecting objects of interest in the image based on the identified context label.

The model includes an identifying means, and a selecting means. In one aspect, the identifying means, and/or selecting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

The model may also include a means for training and a means for creating. In one aspect, the training mean and/or the creating means may be the general-purpose processor 102, program memory associated with the general-purpose processor 102, memory block 118, local processing units 202, and or the routing connection processing units 216 configured to perform the functions recited.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of object detection, comprising:
   identifying, through a deep neural network (DNN), a context label corresponding to a scene of an entire image;
   selecting a set of regions in the image expected to contain an object of interest based at least in part on the identified context label, the set of regions selected prior to locating the object of interest in the image; and
   searching for the object of interest in the set of regions.

2. The method of claim 1, further comprising training the DNN to refine the set of regions.

3. The method of claim 1, further comprising creating the context label based at least in part on user input.

4. The method of claim 1, further comprising creating the context label based at least in part on unsupervised learning.

5. The method of claim 1, further comprising generating the set of regions based at least in part on the context label.

6. The method of claim 1, further comprising:
   identifying another context label; and
   selecting another set of regions in the image expected to contain objects of interest based at least in part on the other identified context label.

7. The method of claim 1, further comprising training the DNN to determine for each of the regions whether the object of interest is present.

8. The method of claim 1, further comprising training the DNN to classify each of the regions according to the context label.

9. An apparatus for object detection, comprising:
   a memory; and
   at least one processor coupled to the memory, the at least one processor configured:
     to identify, through a deep neural network (DNN), a context label corresponding to a scene of an entire image;
     to select a set of regions in the image expected to contain an object of interest based at least in part on the identified context label, the set of regions selected prior to locating the object of interest in the image; and
     search for the object of interest in the set of regions.

10. The apparatus of claim 9, in which the at least one processor is further configured to train the DNN to refine the set of regions.

11. The apparatus of claim 9, in which the at least one processor is further configured to create the context label based at least in part on user input.

12. The apparatus of claim 9, in which the at least one processor is further configured to create the context label based at least in part on unsupervised learning.

13. The apparatus of claim 9, in which the at least one processor is further configured to generate the set of regions based at least in part on the context label.

14. The apparatus of claim 9, in which the at least one processor is further configured:
    to identify another context label; and
    to select another set of regions in the image expected to contain objects of interest based at least in part on the other identified context label.

15. The apparatus of claim 9, in which the at least one processor is further configured to train the DNN to determine for each of the regions whether the object of interest is present.

16. The apparatus of claim 9, in which the at least one processor is further configured to train the DNN to classify each of the regions according to the context label.

17. A non-transitory computer-readable medium for object detection having non-transitory program code recorded thereon, the program code comprising:
    program code to identify, through a deep neural network (DNN), a context label corresponding to a scene of an entire image;
    program code to select a set of regions in the image expected to contain an object of interest based at least in part on the identified context label, the set of regions selected prior to locating the object of interest in the image; and
    searching for the object of interest in the set of regions.

18. The computer-readable medium of claim 17, further comprising program code to train the DNN to refine the set of regions.

19. The computer-readable medium of claim 17, further comprising program code to create the context label based at least in part on user input.

20. The computer-readable medium of claim 17, further comprising program code to create the context label based at least in part on unsupervised learning.

21. The computer-readable medium of claim 17, further comprising program code to generate the set of regions based at least in part on the context label.

22. The computer-readable medium of claim 17, further comprising:
   program code to identify another context label; and
   program code to select another set of regions in the image expected to contain objects of interest based at least in part on the other identified context label.

23. The computer-readable medium of claim 17, further comprising program code to train the DNN to determine for each of the regions whether the object of interest is present.

24. The computer-readable medium of claim 17, further comprising program code to train the DNN to classify each of the regions according to the context label.

25. An apparatus for wireless communication, comprising:
   means for identifying, through a deep neural network (DNN), a context label corresponding to a scene of an entire image;
   means for selecting a set of regions in the image expected to contain an object of interest based at least in part on the identified context label, the set of regions selected prior to locating the object of interest in the image; and
   means for searching for the object of interest in the set of regions.

26. The apparatus of claim 25, further comprising means for training the DNN to refine the set of regions.

27. The apparatus of claim 25, further comprising means for creating the context label based at least in part on unsupervised learning.

28. The apparatus of claim 25, further comprising:
   means for identifying another context label; and
   means for selecting another set of regions in the image expected to contain objects of interest based at least in part on the other identified context label.

* * * * *